United States Patent
Boring

(10) Patent No.: US 7,209,071 B1
(45) Date of Patent: Apr. 24, 2007

(54) SYSTEM AND METHOD FOR DISTANCE MEASUREMENT

(76) Inventor: Steele Boring, 21615 69th Ave., East, Bradenton, FL (US) 34211

( * ) Notice: Subject to any disclaimer, the term of this patent is extended or adjusted under 35 U.S.C. 154(b) by 127 days.

(21) Appl. No.: 10/840,353

(22) Filed: May 7, 2004

(51) Int. Cl.
G01S 13/74 (2006.01)
G01S 13/00 (2006.01)

(52) U.S. Cl. .............. 342/42; 342/43; 342/51; 342/118; 342/125; 342/175; 342/192; 342/193; 342/195

(58) Field of Classification Search .......... 342/29–51, 342/118, 125, 175, 195, 385, 386, 399–406, 342/192–197
See application file for complete search history.

(56) References Cited

U.S. PATENT DOCUMENTS

| | | | |
|---|---|---|---|
| 3,823,400 A * | 7/1974 | Deck ..................... 342/399 |
| 4,170,773 A * | 10/1979 | Fitzsimmons et al. ...... 342/42 |
| 4,188,629 A * | 2/1980 | Johnson ................... 342/46 |
| 4,598,275 A | 7/1986 | Ross et al. |
| 4,757,315 A * | 7/1988 | Lichtenberg et al. ...... 342/125 |
| 4,804,961 A * | 2/1989 | Hane ....................... 342/125 |
| 5,021,794 A | 6/1991 | Lawrence |
| 5,196,825 A | 3/1993 | Young |
| 5,289,163 A | 2/1994 | Perez et al. |
| 5,317,315 A * | 5/1994 | Karhunen et al. .......... 342/125 |
| 5,396,224 A | 3/1995 | Dukes et al. |
| 5,442,558 A | 8/1995 | Kyrtsos et al. |
| 5,621,388 A | 4/1997 | Sherburne et al. |
| 5,629,678 A | 5/1997 | Gargano et al. |
| 5,652,570 A | 7/1997 | Lepkofker |
| 5,712,619 A | 1/1998 | Simkin |
| 5,742,233 A | 4/1998 | Hoffman et al. |
| 5,812,056 A | 9/1998 | Law |
| 5,828,306 A | 10/1998 | Curran |
| 5,835,907 A | 11/1998 | Newman |
| 5,852,401 A | 12/1998 | Kita |
| 5,870,029 A | 2/1999 | Otto et al. |
| 5,892,454 A | 4/1999 | Schipper et al. |
| 5,898,367 A | 4/1999 | Berube |
| 5,917,425 A | 6/1999 | Crimmins et al. |
| 5,933,079 A | 8/1999 | Frink |
| 5,939,988 A | 8/1999 | Neyhart |
| 5,940,004 A | 8/1999 | Fulton |
| 5,959,529 A | 9/1999 | Kail, IV |
| 6,028,514 A | 2/2000 | Lemelson et al. |
| 6,031,454 A | 2/2000 | Lovejoy et al. |
| 6,034,622 A | 3/2000 | Levine |
| RE36,791 E | 7/2000 | Heller |
| 6,100,806 A | 8/2000 | Gaukel |
| 6,108,558 A | 8/2000 | Vanderspool, II |
| 6,121,926 A | 9/2000 | Belcher et al. |
| 6,127,931 A | 10/2000 | Mohr |
| 6,134,448 A | 10/2000 | Shoji et al. |
| 6,169,484 B1 | 1/2001 | Schuchman et al. |

(Continued)

Primary Examiner—Bernarr E. Gregory
(74) Attorney, Agent, or Firm—Duane S. Kobayashi

(57) ABSTRACT

A system and method for performing distance measurement using wireless signals. A time of flight calculation is enabled by an interrogating device that transmits an interrogation signal to a responding device, which returns a synchronized signal back to the interrogating device. The wireless signals between the interrogating device and the receiving device have a harmonic relationship. In one embodiment, a time shift of a received signal relative to a transmitted interrogation signal is determined based on a comparison of a first reference point on a signal representative of the transmitted interrogation signal and a second reference point on a signal representative of the received signal.

23 Claims, 4 Drawing Sheets

U.S. PATENT DOCUMENTS

| | | |
|---|---|---|
| 6,175,308 B1 | 1/2001 | Tallman et al. |
| 6,181,253 B1 | 1/2001 | Eschenbach et al. |
| 6,198,394 B1 | 3/2001 | Jacobson et al. |
| 6,204,772 B1 | 3/2001 | DeMay et al. |
| 6,211,790 B1 | 4/2001 | Radomsky et al. |
| 6,218,945 B1 | 4/2001 | Taylor, Jr. |
| 6,225,901 B1 | 5/2001 | Kail, IV |
| 6,239,700 B1 | 5/2001 | Hoffman et al. |
| 6,243,039 B1 | 6/2001 | Elliot |
| 6,268,797 B1 | 7/2001 | Berube et al. |
| 6,292,106 B1 | 9/2001 | Solinsky et al. |
| 6,693,581 B2 * | 2/2004 | Gottwald et al. ........... 342/125 |

* cited by examiner

SYSTEM AND METHOD FOR DISTANCE MEASUREMENT

BACKGROUND

1. Field of the Invention

The present invention relates generally to distance measurement and, more particularly, to a system and method for distance measurement using harmonic signals.

2. Introduction

Wireless communication devices have been used to calculate distance measurements between two locations. In one method, known as the light wave method, a receiver is used to detect a laser signal that has been reflected off of an object. This method is limited, however, because it requires a direct line of sight to the object. Moreover, this method is limited to the calculation of distances to the surfaces of objects or structures.

In another method, radio frequency transmissions are used. This radio frequency method has the advantage of penetrability in that all points on a site are locatable, even points that are hidden from view. In this process, an interrogating device would send a first signal to a responding device, which would then reply (ideally with virtually zero delay) with a second signal back to the interrogating device. In one implementation the time of flight of the signal can be used to extrapolate a distance measurement. Here, the time of flight would represent the span of time between the sending of the first signal and the receipt of the second signal. Various limitations exist in this technique, such as the minimization of the delay at the responding device before a signal is returned to the interrogating device, or the difficulty in accurately determining transmission times at either device. Indeed, in some embodiments, three transmitting devices are needed to determine the location of the responding device.

SUMMARY

The present invention provides a system and method for performing distance measurement using wireless signals. In one embodiment, the wireless signals between an interrogating device and a responding device have a harmonic relationship.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

In accordance with the present invention, a time of flight method for accurate distance measurement is provided. In this time of flight method, an interrogating device transmits an interrogation signal (e.g., radio frequency signal) to a responding device, which returns a synchronized signal back to the interrogating device. It is a feature of the present invention that the signal returned to the interrogating device is at a harmonic frequency to the frequency of the interrogation signal.

Figure 1A:
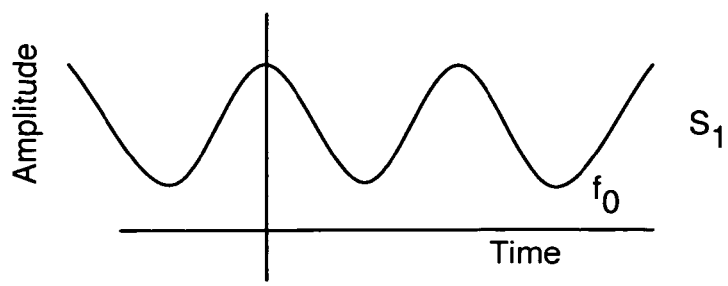
FIGS. 1A–1C illustrate an example of a harmonic signal that is returned to an interrogating device from a responding device.
Figure 1B:
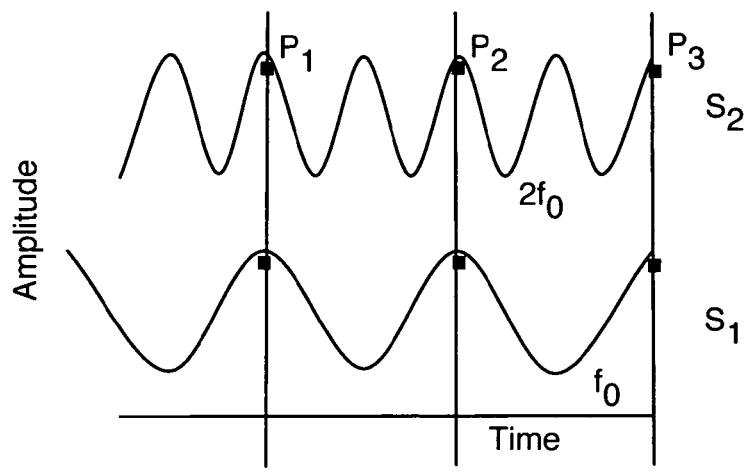
Figure 1C:
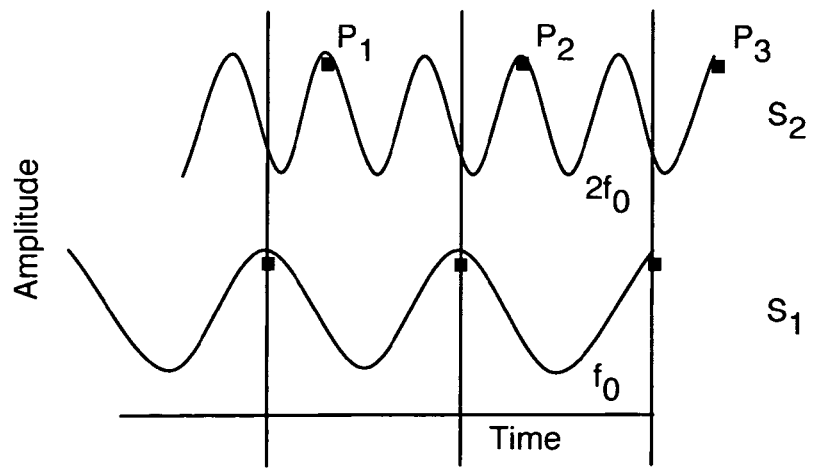

FIGS. 1A–1C provide a simple illustration of the relationship between the signal that is transmitted by the interrogating device and the signal that is returned from the responding device. Here, FIG. 1A illustrates the signal $S_1$ that is transmitted from the interrogating device. This transmitted signal $S_1$ can be an unmodulated signal at a frequency $f_0$. Transmitted signal $S_1$ is received by the responding device and used to generate a second signal $S_2$ that is a harmonic of signal $S_1$.

FIG. 1B illustrates the relationship between signals $S_1$ and $S_2$ at the responding device. As illustrated, signal $S_2$ is at a frequency twice that of signal $S_1$ (i.e., at frequency $2f_0$). As would be appreciated any signal having a harmonic frequency of signal $S_1$ can be used.

At the responding device, the generated signal $S_2$ is first aligned or otherwise synchronized with signal $S_1$. In this alignment process, reference points of signals $S_1$ and $S_2$ are aligned. As illustrated in FIG. 1B, every other peaks of higher-frequency signal $S_2$ is aligned with a peak of the lower-frequency signal $S_1$. As would be appreciated, the specific method of alignment would be implementation dependent and would not depart from the spirit of the present invention. For example, the responding device could choose to align a peak of signal $S_2$ with a mid-transition point of signal $S_1$. Here, since harmonic signals are being used, any arbitrary reference point can be used, wherein such a reference point would be periodically repeating.

The periodic nature of the alignment point enables the responding device to remove any ambiguity regarding its particular time of transmission. This effectively removes any concern regarding the responding device's ability to respond to an interrogation signal with zero delay. This is a major factor in providing an accurate time of flight distance calculation at the interrogating device.

Once the signal $S_2$ is aligned with interrogation signal $S_1$, signal $S_2$ can then be transmitted back to the interrogation device. As illustrated in FIG. 1B, each of the reference points $P_1$–$P_3$ in signal $S_2$ are aligned with correspond peaks of signal $S_1$. Again, it should be noted that the responding device need not respond to an interrogation signal with zero delay. Indeed, the responding device can take as much time as required to align the reply signal to the interrogation signal and transmit the reply signal to the interrogation device. The key aspect of the response is to ensure that the signal $S_2$ is properly aligned with signal $S_1$.

Once signal $S_2$ is aligned with signal $S_1$, it is transmitted back to the interrogation device. During the entire time that the responding device is aligning its signal with the interrogation signal, the interrogation device continues to transmit signal $S_1$ to the responding device. When signal $S_2$ is received at the interrogation device, it is compared in real time to interrogation signal $S_1$.

FIG. 1C illustrates the real time comparison of the signals $S_1$ and $S_2$ at the interrogating device. As illustrated, points $P_1$–$P_3$ in signal $S_2$ are now out of alignment with the corresponding peaks in interrogation signal $S_1$. This shift in alignment can be represented in units of time $T_0$. In the example of FIG. 1C, the shift in alignment is $5T_0$ in length, representing the time-of flight round-tip delay time between the interrogating device and the responding device.

When this shift in alignment $5T_0$ is multiplied by the transmission speed of the signal (i.e., the speed of light), which result is divided by two, a distance measurement can then be determined by the interrogating device.

To further illustrate the calculation methodology, consider an example where the interrogating device sends a 1 MHz signal to the responding device. Here, as in the example of FIGS. 1A–1C, the responding device is programmed to harmonize and send back a 2 MHz signal (a 2:1 frequency ratio).

If the time increments $T_0$ are each 100 nanoseconds ($100 \times 10^{-9}$ sec) there is a time shift of 500 nanoseconds (500 ns). Using the speed of light ($3 \times 10^8$ meters/sec) the distance between the interrogating device and the responding device is $[(500 \times 10^{-9}\ \text{sec}) * (3 \times 10^8\ \text{meters/sec})]/2 = 75$ meters. For different ranges of distance, the frequency of the signals may be increased or decreased as appropriate. Also, for different ranges of accuracy, the clock rate of the system may be increased or decreased as appropriate. Table I illustrates a range of distances that would correspond to each incremental time shift $T_0$.

TABLE 1

| Time Shift ($T_0$) | Distance |
| --- | --- |
| 100 picoseconds | 0.015 meters |
| 1 nanosecond | 0.15 meters |
| 10 nanoseconds | 1.5 meters |
| 100 nanoseconds | 15 meters |
| 1 microsecond | 150 meters |

More generally, if the wavelengths are short and distances between the devices are long, there is a possibility that the time shift may exceed a single wavelength, leading to an undetected overlap of the signal. If this overlap is not accounted for, a false reading would result. To account for this possibility, in one embodiment, reference pulses can be added to both signals. For example, assuming a 2:1 frequency ration between the responding signal and the interrogation signal, a reference pulse is inserted periodically into the interrogation signal after a set number (N) of wavelengths, while a reference pulse is inserted periodically into the responding signal after a set number (2N) of wavelengths. These reference pulses would enable the interrogating device to identify one or more overlaps in the time shift.

Having described the general methodology of distance measurement using harmonic frequencies, a description of the interrogating and responding devices is now provided. In the following description, reference is made to the system component diagrams of FIGS. 3 and 4, and the flowchart of FIG. 5.

Figure 5:
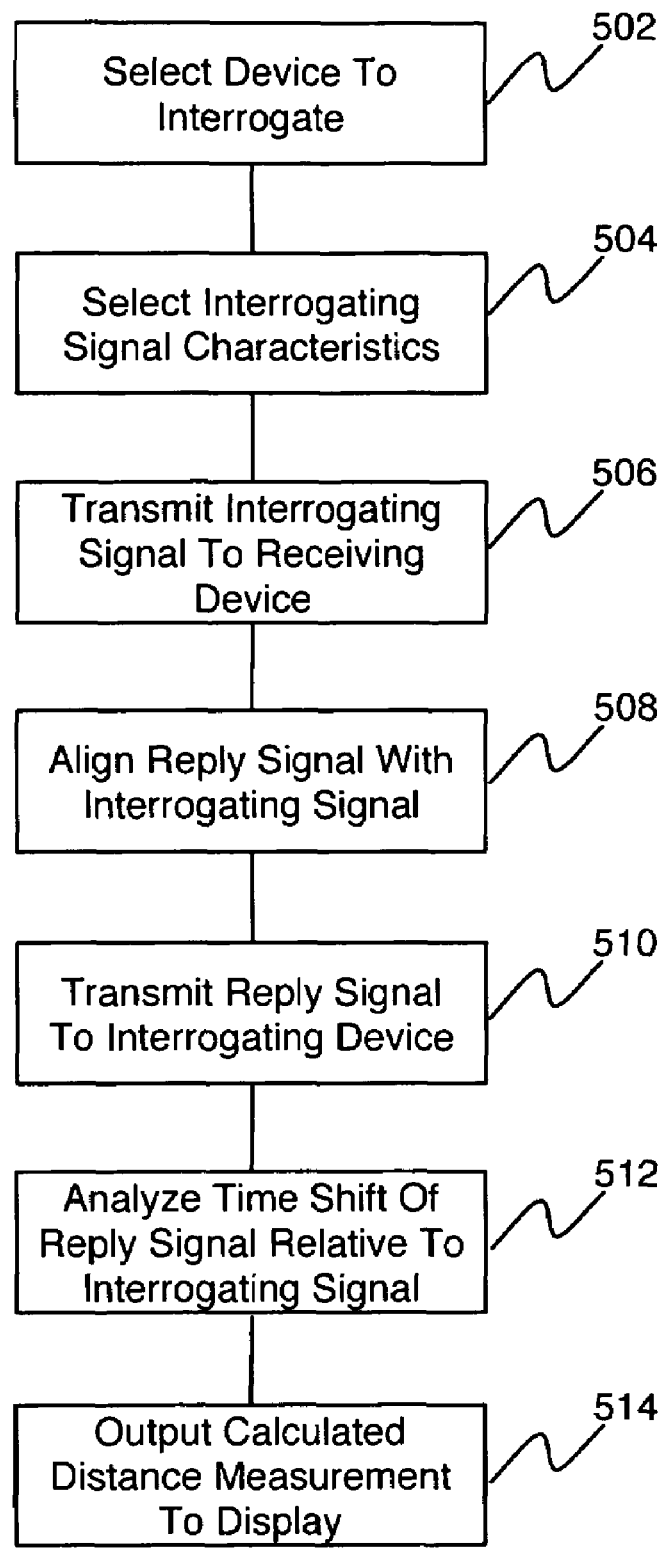
FIG. 5 illustrates a flowchart of a process of the present invention.

As illustrated in the flowchart of FIG. 5, the distance measurement process begins at step 502 where a device is selected for interrogation. Here, it should be noted that in one embodiment the interrogating device and responding device can be paired by default and no selection would be necessary. In this embodiment, the interrogating device and responding device would only be designed to communicate with each other.

In the majority of applications, however, it is envisioned that interrogating device 300 can be designed to operate with a plurality of responding devices to thereby determine distances to a plurality of distinct points at which a respective plurality of responding devices are located. This arrangement would allow a more sophisticated, and hence more expensive, interrogating device to operate with a plurality of relatively inexpensive responding devices.

In this framework, the process of selecting a particular responding device to which a distance measurement is desired can be implemented in a variety of ways. As would be appreciated, this implementation dependent process can be configured for manual or automated operation under the control of microprocessor 310.

Figure 3:
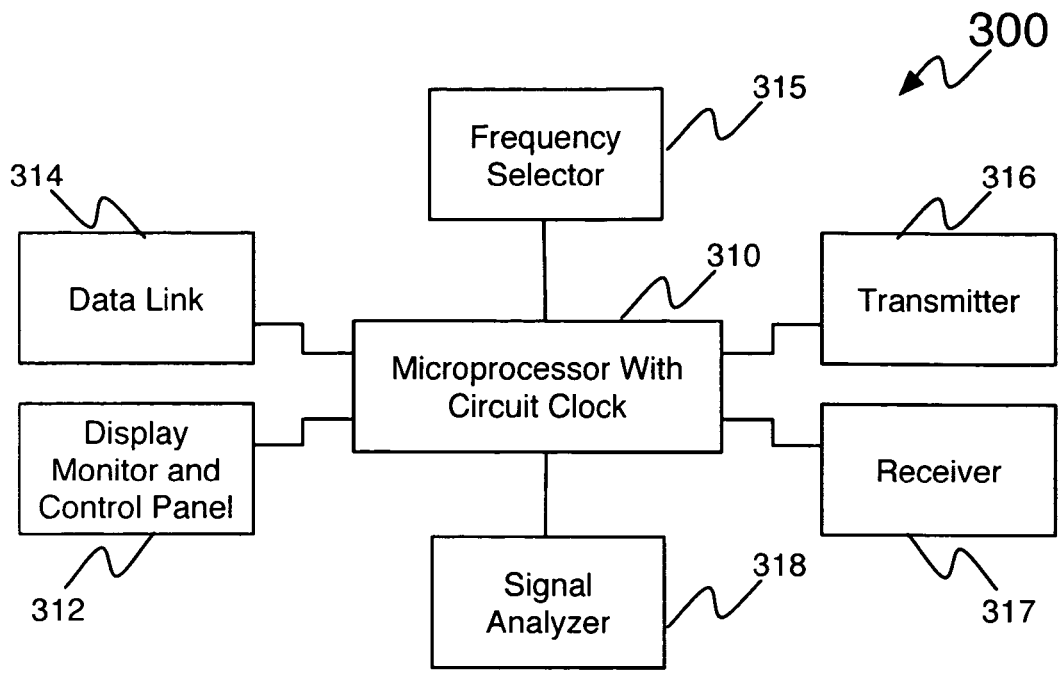
FIG. 3 illustrates an embodiment of an interrogating device.

As illustrated in the embodiment of FIG. 3, interrogating device 300 can include a display monitor and control panel 312 that would facilitate user interaction with interrogating device 300. One element of this user interaction would include the selection of a responding device to which the user desires to determine a distance calculation. In an example of a manual selection operation, the user can use a keypad on the control panel to input an ID of a known responding device. Conversely, in an example of an automated selection operation, the user can select from a plurality of choices that are displayed on the display monitor. For example, in a golf course application, the display monitor can display the respective responding devices that are associated with the 18 different hole locations. During the course of his round of golf, the golfer would simply select a particular hole identifier on the display monitor to initiate a distance calculation.

As further illustrated in FIG. 3, interrogating device 300 can also include data link 314. In various embodiments, data link 314 can be a wired or wireless link. In the context of the device selection process, data link 314 can be used to retrieve data about the various responding devices. In one embodiment, this data could be downloaded to interrogating device 300 before use. In another embodiment, this data could be dynamically retrieved by interrogating device 300, such as for example, by wirelessly querying all responding devices in the range of interrogating device 300. The results of this query could then be displayed on the display monitor for selection by the user. In general, this querying process can be based on any known communication protocol without departing from the scope of the present invention. As would be appreciated, if data link 314 is based on a wireless protocol, data link 314 can also be paired with transmitter 316 as would be apparent.

After a responding device has been selected, at step 504, the interrogating signal characteristics (e.g., frequency, reference pulses, etc.) are then selected. In one embodiment, the interrogating signal characteristics are selected automatically by interrogating device 300 without input from the user. For example, interrogating device 300 could be configured to select interrogating signal characteristics based on the identity of the responding device. In other embodiments, the user can use display monitor and control panel 312 to specify the characteristics of the interrogating signal. As illustrated in FIG. 3, frequency selector 315 can be used to specify the frequency of the interrogation signal. In one embodiment, frequency selector 315 can also be used to select automatically the harmonic signal pairs. For example, frequency selector 315 can be designed to select from 10 sets of harmonic frequency pairs based on the signal environment. This will enable the interrogating device to select a frequency pairing that would meet the least amount of interference from third-party signal sources.

After the interrogating signal characteristics have been determined, interrogating device 300 then transmits the interrogation signal using transmitter 316. This interrogation signal is continuously transmitted as it waits for a response from the responding device. As noted, the continuous transmission of the interrogation signal allows the responding device to take as much time as it needs in generating a harmonic signal response. This results since a zero delay in the responding device's response is not required in the distance measurement process.

Figure 4:
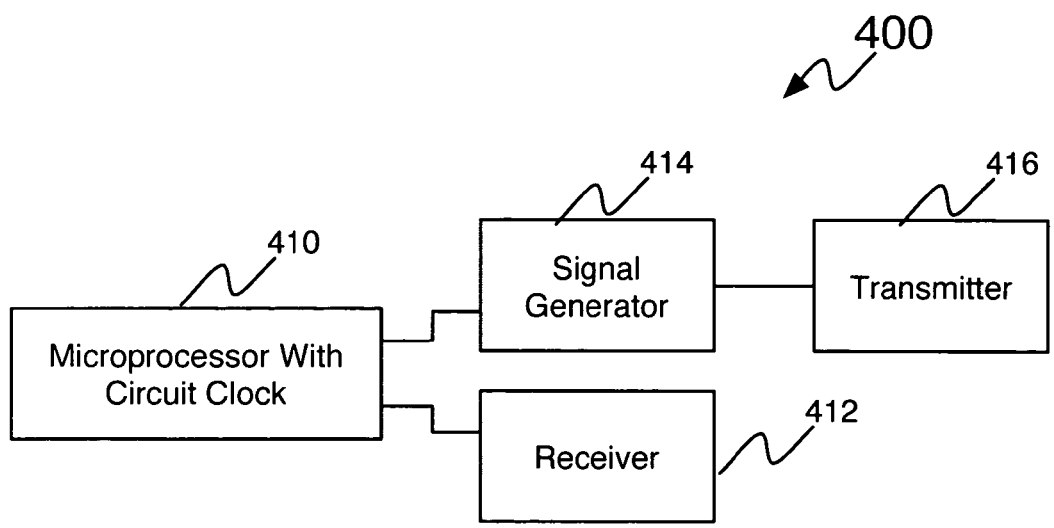
FIG. 4 illustrates an embodiment of a responding device.

As illustrated in FIG. 4, the interrogation signal is received at receiver 412 of responding device 400. This received interrogation signal is then processed by microprocessor 410, at step 508, wherein a reply signal is aligned or otherwise synchronized with the interrogation signal (see FIG. 1B). In this process, signal generator 414 is used to generate a signal having a frequency that is a harmonic of the received interrogation signal frequency. The particular harmonic chosen (e.g., 2:1, 3:1, 4:1, etc.) can be predefined or selected dynamically by either interrogation device 300 or responding device 400. Once the harmonic frequency is chosen, signal generator 414 then proceeds to align the harmonic frequency signal with the received interrogation signal. As noted, this alignment process is designed to align periodic reference points in the harmonic frequency signal with periodic reference points in the received interrogation signal. The particular identity of the reference points (e.g., maximum, minimum, or any transition point) would be implementation dependent. Any pairing of reference points can be used by interrogation device 300 in identifying a time of flight measurement.

It should be noted that while FIG. 4 illustrates a microprocessor 410 with a circuit clock, in one embodiment, responding device 400 would not include a circuit clock. In this embodiment, signal induction techniques can be used to generate the response signal with proper phase alignment.

After the reply signal is properly aligned with the interrogation signal, signal generator then outputs the reply signal to transmitter 416 for transmission, at step 510, to interrogation device 300.

Figure 2:
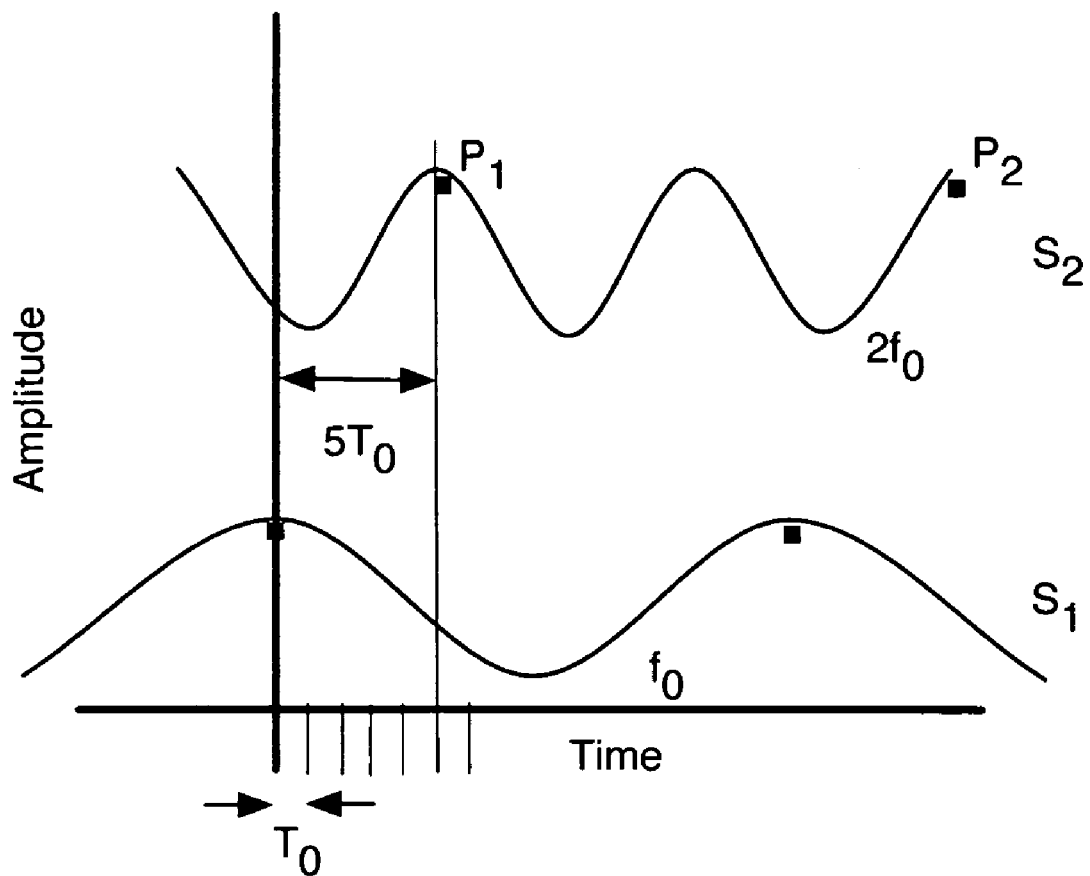
FIG. 2 illustrates a time shift between a harmonic signal that is received from a responding device.

Back at interrogation device 300, the reply signal is received at receiver 317 and analyzed by signal analyzer 318 at step 512. This analysis process is generally operative to determine the time shift between a known reference point in the interrogation signal with a known reference point in the reply signal. An example of a set of reference points at the peaks of both signals is illustrated in FIG. 2. Any set of reference points can be used, however, which reference points can potentially take into account any periodic reference pulses that exist.

After the time shift between the reference points is determined, the time of flight distance calculation is performed, which result is output to the display monitor of interrogation device 300.

As described, one method for determining the time shift is to compare the received signal to the transmitted signal. In an alternative embodiment, the time shift is not measured directly. Rather, the time shift can be determined by comparing the received signal to a time-shifted version of the transmitted signal or a time-shifted harmonic of the transmitted signal. In this embodiment, a time shifted-version of the transmitted signal or its harmonic can be repeatedly adjusted until the phase matches that of the received signal.

In various embodiments, this methodology can be implemented as a phase-tuning device that is incorporated into the interrogating device. Here, the relative tuning can be adjusted manually or automatically in a manner similar to the tuning of the frequency of a particular string in a guitar. Thus tuning can be further assisted through the provision of visual feedback in terms of a needle, colored lights, or other visual cues. For embodiments that use signals in the audible range, this can be further enhanced through sound-based feedback.

More generally, it should be noted that the distance measurement need not be based directly on a measurement of the time shift. Rather, the distance measurement can be based on any form of interference measurement between the interrogating signal and the received signal. In other words, as the phase shift increases, the level of interference between the signal grows. In this embodiment, the interference measure can be algorithmically translated into a distance measurement.

As thus described, the principles of the present invention provide a distance measurement process that advantageously uses a pair of harmonic signals. An advantage of the present invention is its ability to perform distance measurement using signals that can penetrate walls and structures. Distances can therefore be measured to points that are not limited to surfaces of objects. In general, these signals can be used to facilitate the operation of an interrogation device with multiple responding devices at the same time in a continuous or intermittent manner. A further advantage of the present invention is its scalable accuracy. Depending on the application, the accuracy of the distance measurement can be increased or decreased based on the circuit clock. This enables scalable applications that tradeoff issues of accuracy and cost. Still further, the distance measurement process of the present invention does not require a fixed position for distance detection and can be used in various distance measuring, separation detection, location, surveillance, surveying, navigation, construction, architectural and landscape design, interior design, remodeling design and construction contexts.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media.

Although the above description may contain specific details, they should not be construed as limiting the claims in any way. Other configurations of the described embodiments of the invention are part of the scope of this invention. Accordingly, the appended claims and their legal equivalents only should define the invention, rather than any specific examples given.

What is claimed is:

1. A method for measuring distance between an interrogating device and a responding device, comprising:
    transmitting from an interrogating device an interrogation signal at a first frequency;
    receiving a signal from a responding device in response to said interrogation signal, said received signal having a second frequency that is a harmonic of said first frequency;
    determining a time shift of said received signal relative to said transmitted interrogation signal, said determined time shift being based on a comparison of a first reference point on a signal representative of said transmitted interrogation signal and a second reference point on a signal representative of said received signal; and
    determining a distance between the interrogating device and the responding device using said determined time shift.

2. The method of claim 1, wherein said interrogation signal and said received signal include periodic reference pulses.

3. The method of claim 1, wherein one of said first reference point and said second reference point is a signal peak or zero crossing.

4. The method of claim 1, wherein said first reference point is on a periodic reference pulse.

5. The method of claim 1, wherein said determining a distance comprises multiplying said determined time shift by the speed of light.

6. The method of claim 1, wherein said determining a time shift comprises comparing a signal representative of said received signal to a phase-shifted version of a signal representative of said transmitted interrogation signal.

7. The method of claim 1, wherein said determining a time shift comprises comparing a signal representative of said received signal to a phase-shifted version of a harmonic of said transmitted signal.

8. The method of claim 1, wherein said determining a time shift comprises determining an interference measure.

9. The method of claim 1, wherein said determining a time shift comprises phase-tuning a signal representative of said transmitted interrogation signal to a signal representative of said received signal.

10. The method of claim 1, wherein said determining a time shift comprises comparing a signal representative of said received signal to a harmonic of said transmitted signal.

11. A method for measuring distance between an interrogating device and a responding device, comprising:
    receiving from an interrogating device an interrogation signal at a first frequency;
    selecting a second frequency that is a harmonic of said first frequency; and
    transmitting a signal in response to said interrogation signal, said transmitted signal having said second frequency and having a first reference point that is aligned with a second reference point in said received interrogation signal.

12. The method of claim 11, wherein said received interrogation signal includes periodic reference pulses.

13. A system for measuring distance between an interrogating device and a responding device, comprising:
    a transmitter that is configured to transmit an interrogation signal at a first frequency;
    a receiver that is configured to receive a signal from a responding device in response to said interrogation signal, said received signal having a second frequency that is a harmonic of said first frequency;
    a processing system that is configured to determine a time shift of said received signal relative to said transmitted interrogation signal, said determined time shift being based on a comparison of a first reference point on a signal representative of said transmitted interrogation signal and a second reference point on a signal representative of said received signal, and to determine a distance between the interrogating device and the responding device using said determined time shift.

14. The system of claim 13, wherein said interrogation signal and said received include periodic reference pulses.

15. The system of claim 13, wherein one of said first reference point and said second reference point is a signal peak or a zero crossing.

16. The system of claim 13, wherein said first reference point is on a periodic reference pulse.

17. The system of claim 13, wherein said processor multiplies said determined time shift by the speed of light.

18. The system of claim 13, wherein said processing system includes a signal analysis component that is configured to compare a signal representative of said received signal to a phase-shifted version of a harmonic of said transmitted signal.

19. The system of claim 13, wherein said processing system includes a signal analysis component that is configured to compare a signal representative of said received signal to a harmonic of said transmitted signal.

20. The system of claim 13, wherein said determined time shift is based on an interference measure.

21. The system of claim 13, wherein said processing system includes a signal analysis component that phase-tunes a signal representative of said transmitted interrogation signal to a signal representative of said received signal.

22. A system for measuring distance between an interrogating device and a responding device, comprising:
    a receiver that is configured to receive an interrogation signal at a first frequency;
    a processor that is configured to select a second frequency that is a harmonic of said first frequency; and
    a transmitter that is configured to transmit a signal in response to said interrogation signal, said transmitted signal having said second frequency and having a first reference point that is aligned with a second reference point in said received interrogation signal.

23. The system of claim 22, wherein said received interrogation signal includes periodic reference pulses.

* * * * *